June 14, 1932. D. H. MURPHY 1,863,347
ELECTRICAL CABLE
Filed May 25, 1926
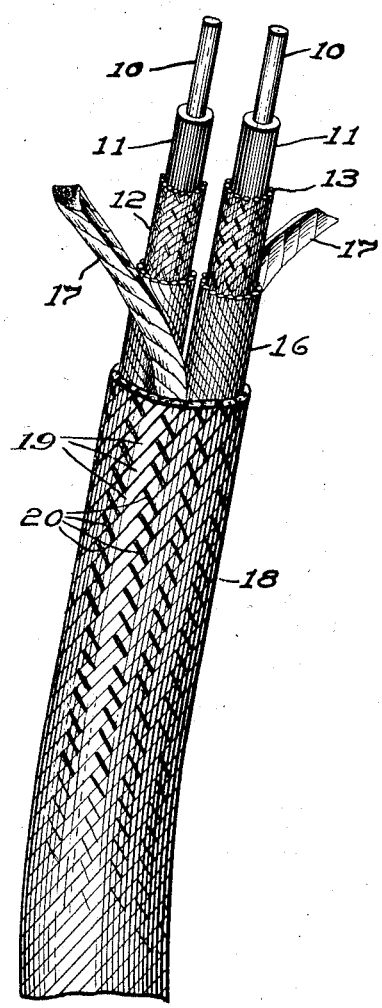
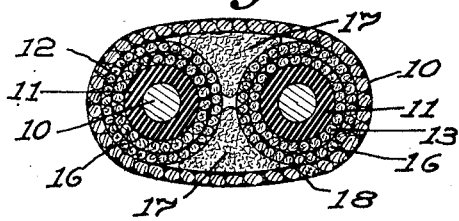
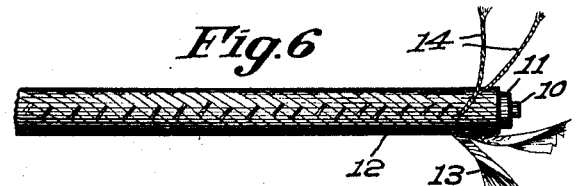
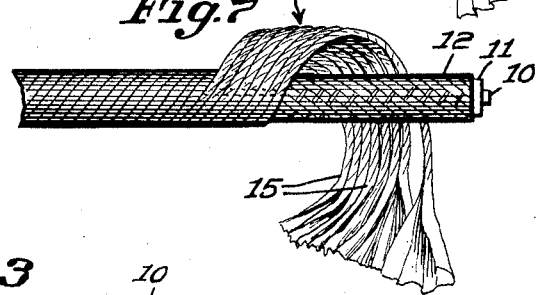
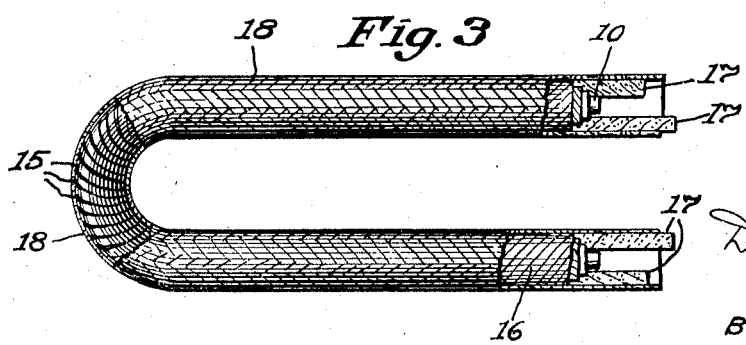
INVENTOR
Daniel H. Murphy
BY
ATTORNEY Patented June 14, 1932

1,863,347

UNITED STATES PATENT OFFICE

DANIEL H. MURPHY, OF WEST HARTFORD, CONNECTICUT, ASSIGNOR, BY MESNE ASSIGNMENTS, TO GENERAL CABLE CORPORATION, OF NEW YORK, N. Y., A CORPORATION OF NEW JERSEY

ELECTRICAL CABLE

Application filed May 25, 1926. Serial No. 111,514.

This invention relates to electrical cables of the type that are employed in wiring buildings for electric light, heat and power circuits, and more particularly to cables having a non-metallic outer covering.

It is highly important that wires or cables, particularly when used in wiring buildings, be well insulated electrically and that they also be well protected against mechanical injury. It has therefore been the general practice heretofore to encase the electrical cables in flexible metallic sheaths, or to install them in pipe conductors. The pipe conductors afford excellent mechanical protection after the cables are installed, but they do not increase the electrical insulation, and are likely to injure the covering upon the conductor wires as the wires are drawn through the pipes; furthermore they constitute an expensive form of electrical installation.

The flexible metallic sheaths afford good mechanical protection, but do not increase the electric insulation and are open to the objection that if the metallic sheath is crushed an edge of the spiral wrapping from the sheath is likely to cut the insulation upon the enclosed conductors and short-circuit them.

In both types of installations just described it is highly important that the metallic casing of all conductors be well grounded. Often the grounding of the metallic sheaths is not effectively accomplished and when the sheaths are not properly grounded an extremely dangerous condition exists in case a short circuit occurs.

Having the foregoing in mind, the present invention relates to electrical cables having a non-metallic outer covering, that encloses metallic conductors which are well protected both mechanically and electrically.

The electrical cable forming the subject matter of the present invention, in order to withstand the various injurious forces to which it may be subjected in installation and use should be so constructed that it will not be injured by a heavy crushing force or by rough, relatively sharp surfaces. One of the features of the present invention, therefore, resides in the construction whereby each conductor wire is provided with a plurality of jackets that are formed of extremely tough durable material which affords good mechanical and electrical protection for the wires.

A non-metallic sheathed cable for wiring buildings should be so constructed that it may be bent at sharp angles without injuring the same, and another feature of the present invention therefore resides in the construction whereby the covering layers forming the protecting jackets for the conductors will not tend to pile up or open when the cable is bent at a sharp angle.

It has been proposed heretofore to place fillers formed of cord or other material in the valleys between the conductors, as the fillers serve to exclude air spaces and to provide a relatively smooth exterior for the outer jacket that encloses and unites the individual conductors. These fillers as employed heretofore have been secured in the valleys between the conductors, and to the wall of the outer jacket by an adhesive material that becomes hard upon drying, with the result that relative movement between the fillers and outer jacket is prevented when the cable is bent, thus causing the filler at the outside of the bent cable to be subjected to a rupturing strain. This difficulty is overcome in accordance with the present invention by treating the jackets of the individual conductors and the fillers with a wax-like moisture proofing substance which serves as a lubricant. As a result of this construction relative movement between the fillers and surrounding outer jacket is permitted when the cable is bent, thus relieving the various parts of the cable from excessive stresses.

Other features of the invention in addition to the foregoing will be hereinafter described in connection with the accompanying drawing which illustrates one good, practical form of the invention.

In the drawing:—

Fig. 1 is a perspective view of a short section of a cable constructed in accordance with the present invention, the covering sheaths being progressively removed.

Fig. 2 is a transverse sectional view through the cable of Fig. 1.

Fig. 3 is a side view with parts in section of a bent portion of the cable.

Fig. 4 is a side view of one of the metallic conductors.

Fig. 5 is a side view of the conductor covered with a rubber sheath;

Fig. 6 is a side view of the conductor having braid applied over the rubber sheath; and Fig. 7 is a side view showing a series of cords wound spirally about the braid covered conductor of Fig. 6.

The electrical cable shown in the drawing is provided with two metallic conductors 10, but the features of the present invention may be employed in cables provided with more than two conductors, and some of the features of the present invention may be embodied in a cable provided with a single conductor. Each of the conductors 10 has a surrounding sheath 11 which may be formed of rubber or other suitable material.

A braided covering 12 of special construction is placed over each sheath 11. This braided covering is formed of relatively large, tough strands 13 that extend about the conductor in one direction, and of smaller and more flexible binder strands 14 that extend about the conductor in the opposite direction. The strands 13 are formed of twisted paper and the strands 14 are formed of twisted fibres such as cotton. The large tough strands 13 are bound closely together by the small strong strands 14, which sink into the surface of the twisted paper strands and hold them practically in contact with each other throughout their length. In this manner an extremely strong durable covering is provided about the rubber sheath 11.

Each of the conductors 10 is further protected by a group or series of large tough strands 15 of twisted paper, the strands being laid side by side, as shown, to form what may be termed a spiral wrapper 16. The individual strands 15 are not secured together but are laid side by side. This construction is desirable because it permits relative movement between the strands 15 when the cable is bent at a sharp angle as shown in Fig. 3, wherein it will be seen that the strands 15 are crowded together at the inside of the bend, while they are spread out slightly at the outside of the bend.

Within the valleys formed between the covered conductors 10 are laid the fillers 17 which are preferably formed of large cords that are sufficiently soft to cause the fillers to conform to the shape of the valleys. It is found that if the fillers are firmly secured in the valleys by a strong adhesive they are subjected to a rupturing strain when the cable is bent at a sharp angle. This difficulty is overcome, in accordance with the present invention, by treating the fillers 17, the spirally wound strands 15, and the braid 12 upon the conductors with a wax or other material which will render them moisture-proof and at the same time acts as a lubricant that facilitates relative movement between the parts of the cable.

The permitted movement of the fillers 17 is shown in Fig. 3 wherein it will be seen that the ends of the filler at the inside of the bend project slightly beyond the outer jacket, to be described, while the ends of the filler at the outside of the bend terminate a slight distance from the end of the jacket. When the short section of cable in Fig. 3 is straightened out the ends of the fillers 17 will lie flush with the ends of the cable. The lubricating nature of the moisture proofing material employed also facilitates the spreading of the strands 15 at the point of bend so that these strands accommodate themselves to the bend and prevent the formation of a gap between adjacent strands.

The parts of the cable so far described are enclosed and united by an outer jacket 18 which preferably is formed of a braid that is similar in construction to the braid 12. That is, the outer braid 18 is preferably constructed of twisted paper strands 19 which are secured in place in contact with each other by small strong binding strands 20, as shown. This jacket snugly embraces the covered conductors, while at the same time a slight relative movement may occur between the cover and parts enclosed thereby when the cable is bent, the movement being facilitated by the lubricating nature of the moisture proofing material described.

It will be seen from the foregoing that each electrical conductor 10 is protected by at least one braided conduit 12 formed of tough durable twisted strands secured in close contact with each other by small strong binder strands, and it will be apparent, where greater protection is desired than is afforded by the construction described, that each conductor 10 may be provided with additional braided coverings similar to the braid 12.

The outer jacket 18 is preferably treated with a fire-and-water repellent material such as stearin pitch, and powdered mica may be applied to the treated jacket to prevent adjacent coils of the same from sticking. If desired the jacket 18 may be further treated with silicate of soda to prevent sticking of the adjacent coils of the cable.

It is found that twisted strands of paper such as herein described form an extremely tough and durable protecting covering for electrical conductors and it will be apparent from the foregoing that since the inner braided jacket upon each conductor and the outer jacket 18 are formed largely of these tough strands of paper, and the intermediate covering 16 is formed entirely of twisted strands of paper, the electrical conductors 10 are afforded excellent mechanical protection, while at the same time the finished cable is extremely flexible and may be bent sharply without injuring or permanently displacing any of the insulating material forming the different layers of the conductor covering. This is due largely to the fact that the strands 15 of the spiral wrapper 16 are not adhesively secured to either the inner or outer braided jacket and are free to adjust themselves to changes in the contour of the cable when the same is bent, the free movement between the different layers of the insulating material being promoted by the lubricating properties of the moisture proofing material used in treating the paper strands.

What is claimed is:—

1. An electrical cable, comprising in combination, metallic conductors each having a surrounding sheath of insulating material, a braided covering enclosing the sheath of each conductor and formed of twisted paper cords held in place by smaller and more flexible binder strands, a wrapping formed of a series of twisted paper cords wound spirally about the braid in the opposite direction to the paper cords of the braid and treated with a lubricating material that facilitates relative movement of the cords to conform to the change in contour of the cable when the latter is bent, and an outer jacket surrounding and uniting the conductors.

2. An electrical cable, comprising in combination, metallic conductors each having a surrounding sheath of insulating material, a braided covering for the sheath of each conductor and formed of twisted cords held in place by smaller and more flexible binder strands, a wrapping consisting of a series of separate cords of twisted paper disposed side by side to form a group of cords that are wound spirally about the braid and which cords are treated with a lubricating material that facilitates relative movement of the cords to conform to the change in contour of the cable when the latter is bent, and an outer jacket surrounding and uniting the conductors.

3. An electrical cable, comprising in combination, metallic conductors each having a surrounding sheath of insulating material, a braided covering for the sheath of each conductor and formed of twisted paper cords held in place by smaller and more flexible binder strands, a wrapping consisting of a series of separate cords of twisted paper disposed side by side to form a group of cords that are wound spirally about the braid so that the individual cords may move freely relatively to each other to conform to the contour of the cable when the latter is bent, a moisture proofing compound incorporated in the braided and wrapping covering, and an outer jacket surrounding and uniting the conductors.

4. An electrical cable, comprising in combination, metallic conductors each having a surrounding sheath of insulating material, an inner and an outer covering enclosing each of said sheaths and constructed so that relative movement may occur therebetween when the cable is bent, an outer jacket surrounding and uniting the conductors, filler cords laid in the valleys between the conductors and the surrounding jacket, and each filler cord being treated with a wax-like moisture-proofing substance that lubricates the filler cords to facilitate relative movement between said cords and the jacket when the cable is bent.

5. An electrical cable, comprising in combination, metallic conductors each having a surrounding sheath of insulating material, an inner and an outer covering enclosing each sheath, an outer jacket surrounding and uniting the conductors, filler cords laid in the valleys between the conductors and the surrounding jacket, and the filler cords and conductor coverings being treated with a wax-like moisture proofing substance that lubricates the filler cords and conductor coverings to facilitate relative movement between the filler cords, conductor coverings and jacket when the cable is bent.

6. An electrical cable, comprising in combination, metallic conductors each having a surrounding sheath of insulating material, a flexible covering enclosing each sheath, an outer jacket surrounding and uniting the covered conductors, and said coverings being treated with a waxe-like moisture proofing substance that constitutes a lubricant between the outer jacket and conductor coverings to facilitate relative movement therebetween when the cable is bent.

7. An electrical cable, comprising in combination, metallic conductors each having a surrounding sheath of insulating material, a braided covering enclosing the sheath of each conductor and formed of twisted paper cords held in place by smaller and more flexible binder strands which are intertwined with the paper cords, a wrapping consisting of a series of separate cords of twisted paper disposed side by side to form a group of cords that are wound spirally about each of the braid covered conductors so that the individual cords are free to move relatively to each other to conform to the contour of the cable when it is bent, a moisture proofing compound applied to the wrapping upon each conductor, and an outer jacket surrounding and uniting the conductors.

8. An electrical cable, comprising in combination, metallic conductors each having a surrounding sheath of insulating material, a braided covering enclosing the sheath of each conductor and formed of twisted paper cords held in place by smaller and more flexible binder strands which are intertwined with the paper cords, a wrapping consisting of a series of separate cords of twisted paper disposed side by side to form a group of cords that are wound spirally about said braid in the opposite direction to the paper cords of the braid and so that the individual cords are free to move relatively to each other to conform to the contour of the cable when it is bent, a moisture proofing compound which is applied to the braid and wrapping, and an outer jacket surrounding and uniting the conductors.

9. An electrical cable, comprising in combination, a metallic conductor having a surrounding sheath of insulating material, a braided covering enclosing said sheath and formed of twisted paper cords held side by side substantially in edge contact with each other by smaller and more flexible binder strands, an outer jacket surrounding the braided covering, said braided covering being treated with a wax-like moisture proofing substance that constitutes a lubricant between the jacket and conductor covering to facilitate movement between portions of the jacket and covering when the cable is bent.

10. An electrical cable, comprising in combination, a pair of metallic conductors each having a surrounding sheath of insulating material, a braided covering enclosing the sheath of each conductor and formed of twisted paper cords held in place and in contact with adjacent cords throughout a major portion of their length by smaller and more flexible binder strands which are interbraided with the paper cords, a wrapping for each conductor and consisting of a series of separate cords of twisted paper disposed side by side to form a group of cords that are wound spirally about said braid so that they are free to move relatively to each other when the cable is bent, an outer braided jacket surrounding and uniting the insulated conductors and formed of twisted paper strands interbraided with smaller and more flexible strands, and the inner braided coverings and spiral wrappings being treated with a wax-like moisture proofing substance that constitutes a lubricant between the different layers of insulating material to facilitate relative movement therebetween.

11. An electrical cable comprising, in combination, metallic conductors each having a surrounding sheath of insulating material, a braided covering surrounding the insulating sheath of each conductor, a protective wrapping comprising a series of separate cords of twisted paper disposed side by side to form a group of cords that are wound spirally about the braid so that they are free to move relatively to each other when the cable is bent, and an outer braided jacket surrounding and uniting the conductors, said cords being treated with a wax-like moisture proofing substance that constitutes a lubricant facilitating relative movement between the different layers of insulating material when the cable is bent.

12. An article of manufacture comprising, in combination, an electrical conductor, insulating means therefor comprising a braided jacket provided with a moisture-proofing compound, said jacket having a fibrous strip wrapping and oppositely spiralled binding threads, a fibrous wrapping over said jacket, and an outer sheath surrounding the whole.

13. An article of manufacture comprising, in combination, an electrical conductor, a body of insulating compound over said conductor, means affording the conductor additional mechanical and electrical protection comprising a multiple-strip wrapping and oppositely spiralled binding threads interbraided therewith, a wrapping of fibrous material directly over said multiple-strip wrapping, and an outer protective jacket over the whole.

In testimony whereof, I have signed my name to this specification.

DANIEL H. MURPHY.